US008201252B2

(12) United States Patent
Chuah et al.

(10) Patent No.: US 8,201,252 B2
(45) Date of Patent: Jun. 12, 2012

(54) METHODS AND DEVICES FOR PROVIDING DISTRIBUTED, ADAPTIVE IP FILTERING AGAINST DISTRIBUTED DENIAL OF SERVICE ATTACKS

(75) Inventors: Mooi Choo Chuah, Marlboro, NJ (US); Wing Cheong Lau, Middletown, NJ (US); On-Ching Yue, Middletown, NJ (US)

(73) Assignee: Alcatel Lucent, Paris (FR)

( * ) Notice: Subject to any disclaimer, the term of this patent is extended or adjusted under 35 U.S.C. 154(b) by 2224 days.

(21) Appl. No.: 10/232,660

(22) Filed: Sep. 3, 2002

(65) Prior Publication Data

US 2004/0054924 A1 Mar. 18, 2004

(51) Int. Cl.
*G06F 11/00* (2006.01)

(52) U.S. Cl. ............ 726/24; 726/22; 726/23; 726/26; 713/189; 713/190; 713/191; 713/192; 713/193; 713/194; 705/51; 705/52; 705/53; 705/54; 717/174; 717/175; 717/176; 717/177; 717/178

(58) Field of Classification Search ............ 726/13, 726/11, 22–26; 713/189–194; 705/51–54; 717/174–178
See application file for complete search history.

(56) References Cited

U.S. PATENT DOCUMENTS

| 6,738,355 | B1 * | 5/2004 | Love et al. ............ 370/252 |
| 6,990,101 | B1 * | 1/2006 | Chow et al. ............ 370/392 |
| 2002/0032871 | A1 * | 3/2002 | Malan et al. ............ 713/201 |
| 2003/0023733 | A1 * | 1/2003 | Lingafelt et al. ............ 709/229 |
| 2003/0065944 | A1 * | 4/2003 | Mao et al. ............ 713/201 |
| 2003/0093691 | A1 * | 5/2003 | Simon et al. ............ 713/201 |
| 2003/0145232 | A1 * | 7/2003 | Poletto et al. ............ 713/201 |

OTHER PUBLICATIONS

W. Feng, D. Kandlur, D. Saha, and K. Shin, "Stochastic Fair Blue: A Queue Management Algorithm for Enforcing Fairness". Proc. INFOCOM 2001l, Apr. 2001.
R. Mahajan, S.M. Bellovin, S. Floyd, J. Ioannidis, V. Paxson, and S. Shenker, "Controlling High Bandwidth Aggregates in the Network," ACIRI, Jul. 13, 2001.
Y. Zhang and W. Lee, "Intrusion Detection in Wireless Ad-Hoc Networks, Proc. Sixth Annual ACM/IEEE International Conference on Mobile Computing and Networking", pp. 275-283, Aug. 2000.

(Continued)

*Primary Examiner* — Christian Laforgia
*Assistant Examiner* — Roderick Tolentino
(74) *Attorney, Agent, or Firm* — Capitol Patent & Trademark Law Firm, PLLC.

(57) ABSTRACT

The present invention provides systems and methods for providing distributed, adaptive IP filtering techniques used in detecting and blocking IP packets involved in DDOS attacks through the use of Bloom Filters and leaky-bucket concepts to identify "attack" flows. In an exemplary embodiment of the present invention, a device tracks certain criteria of all IP packets traveling from IP sources outside a security perimeter to network devices within the security perimeter. The present invention examines the criteria and places them in different classifications in a uniformly random manner, estimates the amount of criteria normally received and then determines when a group of stored classifications is too excessive to be considered normal for a given period of time. After the device determines the criteria that excessive IP packets have in common, the device then determines rules to identify the packets that meet such criteria and filters or blocks so identified packets.

28 Claims, 4 Drawing Sheets

OTHER PUBLICATIONS

David Moore, Geoffrey Voelker, and Stefan Savage, "Inferring Internet Denial of Service Activity", Proceedings of the 2001 USENIX Symposium, Washington, DC, Aug. 2001.

Stefan Savage, David Wetherall, Anna Karlin and Tom Anderson, "Network Support for IP Traceback", ACM/IEEE Transactions on Networking, 9(3):226-237, Jun. 2001, also appears in Sigcom 2000.

T.M. Gil, and M. Poletto, "MULTOPS: a data-structure for bandwidth attack detection", the Proceedings of the 10th USENIX Security Symposium, Aug. 2001.

Alex C. Snoeren (MIT), Craig Partridge, Luis A. Sanchez, Christine E. Jones, Fabrice Tchakountio, "Hash-Based IP Traceback", ACM Sigcomm, 2001.

Kihong Park, Heejo Lee, "On the Effectiveness of Route-Based Packet Filtering for Distributed DoS Attack Prevention in Power Law Internets,", ACM Sigcomm, 2001.

Heejo Lee and Kihong Park, "On the Effectiveness of Probabilistic Packet Marking for IP Traceback under Denial of Service Attack", IEEE Infocom, 2001.

Haining Wang, Danlu Zhang, and Kang G. Shin, "Detecting SYN Flooding Attacks", IEEE Infocom, 2002.

C. Estan and G. Varghese, New Directions in Traffic Measurements and Accounting:, in the proceedings of ACM SIGCOMM Internet Measurement Workshop 2001.

\* cited by examiner

METHODS AND DEVICES FOR PROVIDING DISTRIBUTED, ADAPTIVE IP FILTERING AGAINST DISTRIBUTED DENIAL OF SERVICE ATTACKS

BACKGROUND OF THE INVENTION

One threat faced by Internet and other networks is a distributed denial of service (DDOS) attack. In such a scheme, a network device (commonly a server, i.e., a specialized computer used in an Internet-Protocol (IP)-based network) is bombarded with IP packets from many sources, in various forms including email, file transfers and so-called ping/UDP/ICMP floods, so that the network device (ND) is overloaded and rendered useless for normal operations. Typically, the participating sources are themselves victims because the offending instructions and codes were planted ahead of time (e.g., via computer viruses) to be activated simultaneously at some later date to overwhelm the ND. Traditional preventative methods, such as so-called "firewalls," are not effective against such attacks because such methods can only be programmed against known threats and because the filtering they provide is not effective to prevent IP packets, which are normally harmless, from causing problems within the network.

Generally, networks attempt to detect the onslaught of a DDOS attack and identify the servers and sub-networks under attack. Because it is not known ahead of time which ND will be attacked, all traffic going to all NDs needs to be monitored, generally by devices known as network processors (NP). Consequently, the scalability of such a monitoring process is of paramount concern because of the potentially large number of servers, hosts, and sub-networks needed to be protected and the high volume of traffic that needs to be examined by NPs in real-time.

A monitoring process which attempts to monitor and catalog every detail of every IP packet is quickly overwhelmed. Thus, to effectively prevent DDOS attacks, NPs must operate using a minimum number of states or traffic statistics in order to keep storage and computational requirements within a practical range. Accordingly, there is need for highly efficient techniques for detecting, identifying and preventing DDOS attacks.

SUMMARY OF THE INVENTION

The present invention overcomes the limitations of conventional techniques by providing distributed, adaptive IP filtering techniques to detect and block IP packets involved in DDOS attacks through the use of Bloom Filters and so-called "leaky-bucket" concepts to identify "attack" flows.

In an exemplary embodiment of the present invention, a device tracks certain criteria associated with all IP packets traveling from IP sources outside a security perimeter to network devices within the security perimeter. Thereafter, each criterion is examined and placed into different classifications in a uniformly random manner and the amount of criteria normally received in the classifications is estimated. The device further determines when a group of stored classifications is too excessive to be considered normal for a given period of time which is an indication of the existence of excessive IP packets. The device then determines rules to identify IP packets meeting certain common criteria and filters or blocks excessive IP packets.

DETAILED DESCRIPTION

The present invention provides for distributed, adaptive IP filtering techniques for detecting and blocking packets involved in a DDOS attack. Although the present invention may be utilized in a variety of applications or devices, the operation of the present invention will be described using specific embodiments (i.e., examples). The present invention envisions preventing the disablement of Internet network devices when an IP packet source(s) sends an inordinate amount of IP packets in an attempt to disable such devices.

In an exemplary embodiment of the present invention an NP is used to protect a network server from an overload of IP packets sent from a router.

Figure 1:
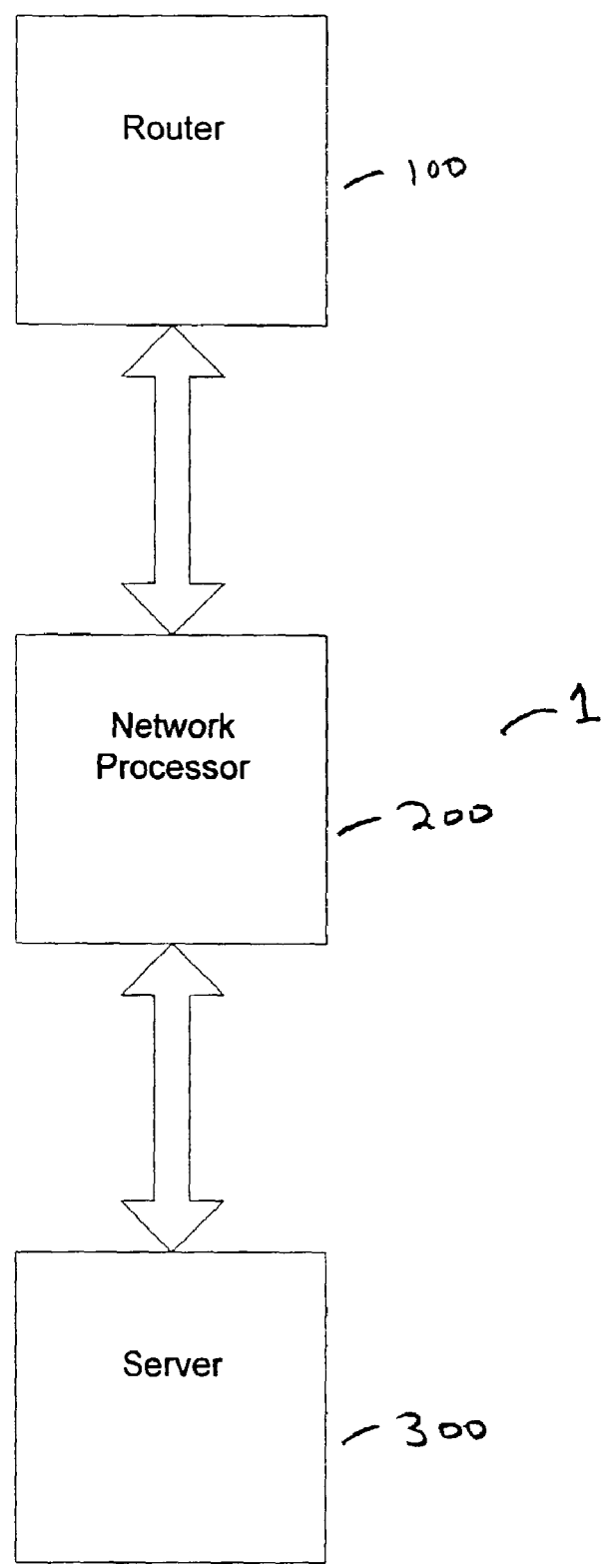
FIG. 1 shows a simplified block diagram of a network according to one embodiment of the invention.

Referring now to FIG. 1, NP 200 is shown within network 1. The network 1 also comprises at least one router 100 and at least one server 300. The NP 200 is adapted to detect and filter IP packets traveling from the router 100 to the server 300. IP packets come in various forms including email, file transfers, and ping/UDP/ICMP floods. Those skilled in the art will appreciate that NPs are generally capable of processing IP packets as fast as they can receive them at OC3 or above rates (i.e., at a rate of hundreds of thousands of packets per second).

It should be noted that although server 300, NP 200 and router 100 have been depicted as three units in FIG. 1, they may comprise fewer or additional units.

In one embodiment of the present invention, one or more NPs 200 may be situated so that a "security perimeter" is established around one or more servers 300 forming a "protected" network such that at least one NP 200 is between any router 100 outside the security perimeter and any server 300 inside the security perimeter. In an alternative embodiment, the security perimeter is aligned with existing administrative boundaries in the context of Internet inter-domain routing. Thus, for example, a security perimeter may be established so that all servers connected with the domain name www.acme-.com are within a protected network.

A security perimeter may also be established so that the router(s) 100 is also contained within it. Such a security perimeter would allow for multiple security perimeters to be constructed. Security perimeters may also be set up to cover multiple networks or to cover separate "partition zones" within a network. Security perimeters may further be constructed in various manners so as to include concentric and non-intersecting coverage. Multiple security perimeters aid in the ability to identify, isolate and filter attacking IP packets.

Figure 2:
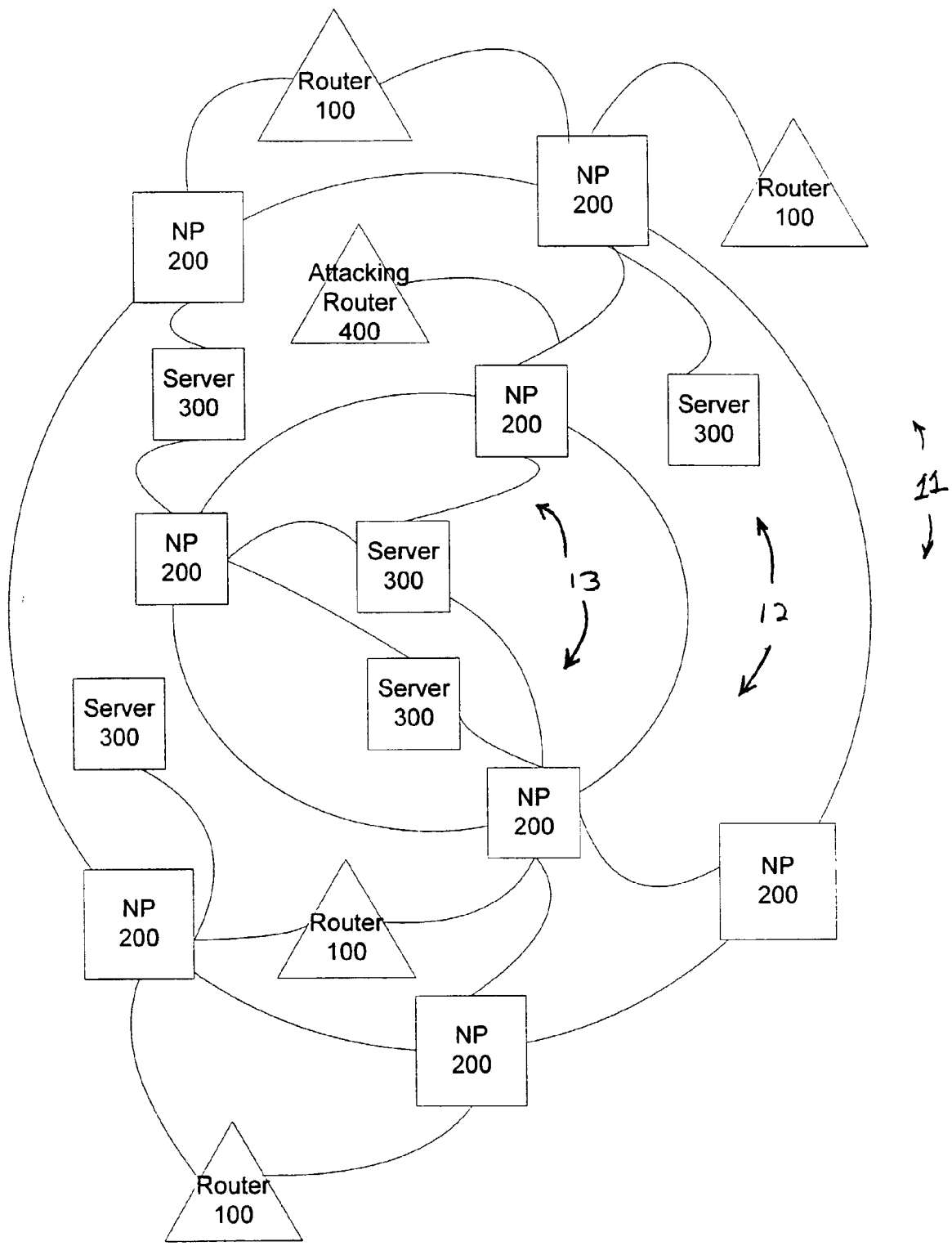
FIG. 2 shows a simplified block diagram of a network where NPs are placed so as to form concentric rings according to one embodiment of the invention.

For example, as shown in FIG. 2, NPs 200 may be situated in concentric rings defining three different zones such as zone 11, zone 12 and zone 13, and adapted to exchange information between themselves regarding each separate zone. Such a setup aids in determining when particular zones are attacked.

How NPs 200 are configured also aids in determining the origination of an attack. By comparing the existence of suspicious flows (a flow being a series of IP packets and a suspicious flow being one that tends to be classified as an "attacking" flow) within certain zones, but not others, the originating source may be discovered. Once an attacking flow is detected, the zone (or zones) size may be dynamically adjusted or redefined by a server 300 or NP 200 to aid in determining the exact location of an attacking router 400. The NPs 200 are adapted to determine the location or identity of an attacker using "conservation of flow concepts." For example, each NP 200 is adapted to detect when a flow travels through a particular zone without an increase in its suspicious flow.

Figure 3:
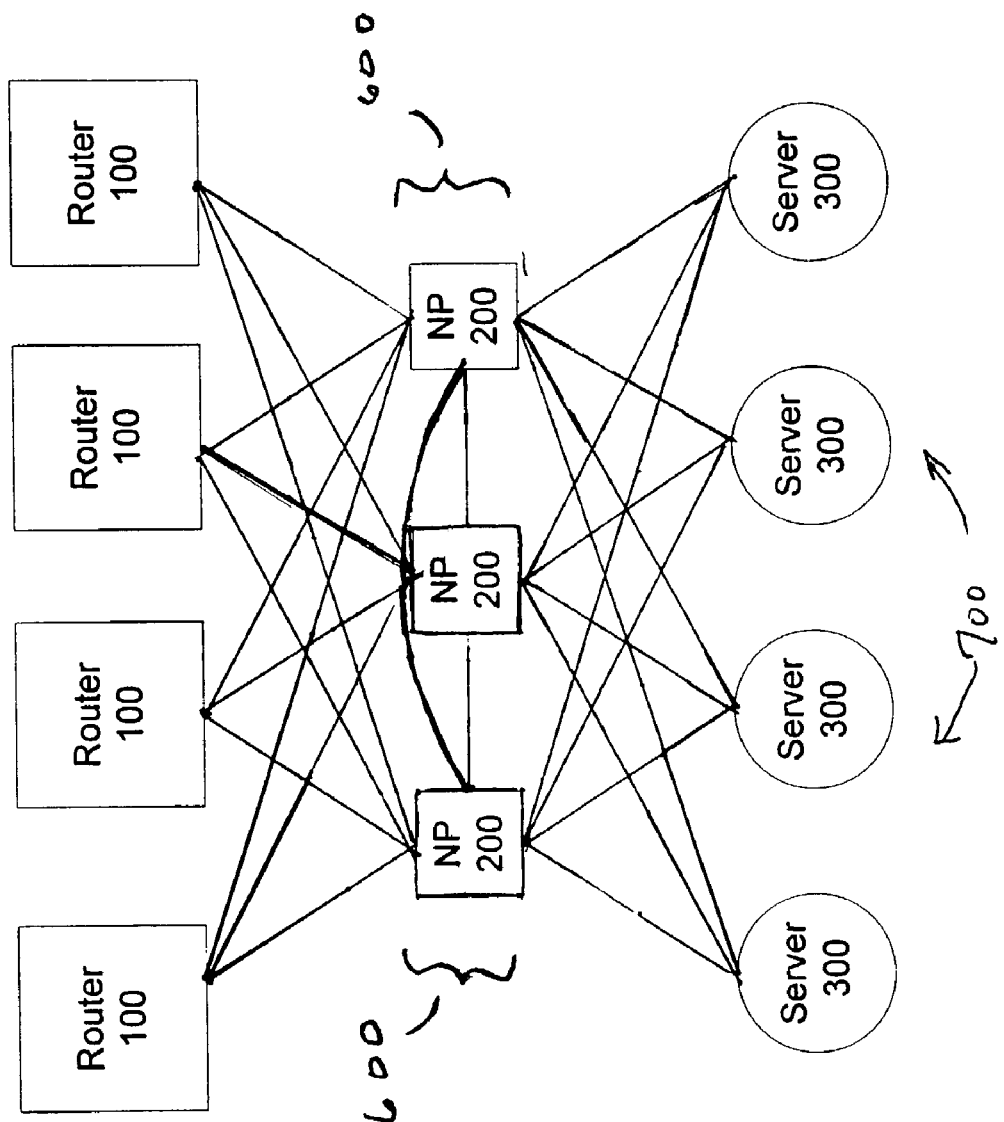
FIG. 3 shows a simplified block diagram of a network according to another embodiment of the invention in which NPs utilize separate communications methods.

Turning now to FIG. 3, when multiple NPs 200 are used, they form a security perimeter 600. In an illustrative embodiment of the present invention, the NPs 200 are adapted to operate using a communications method separate from a protected network 700 of servers 300. This embodiment allows information gathered by each NP 200 to be shared between all NPs 200 and allows information to be relayed to an independent system. An example of an independent system is a computing device that allows for off-line recordation and analysis of IP packet traffic.

Each of the NPs 200 are adapted to detect abnormalities in communications traffic traveling from routers 100 outside the security perimeter to servers 300 within the security perimeter. This may be carried out in a variety of ways. As envisioned by the present inventors, one embodiment of the present invention comprises one or more NPs 200 each adapted to detect such abnormalities based on so-called "Bloom Filters" and "leaky-bucket" traffic measurement techniques.

Figure 4:
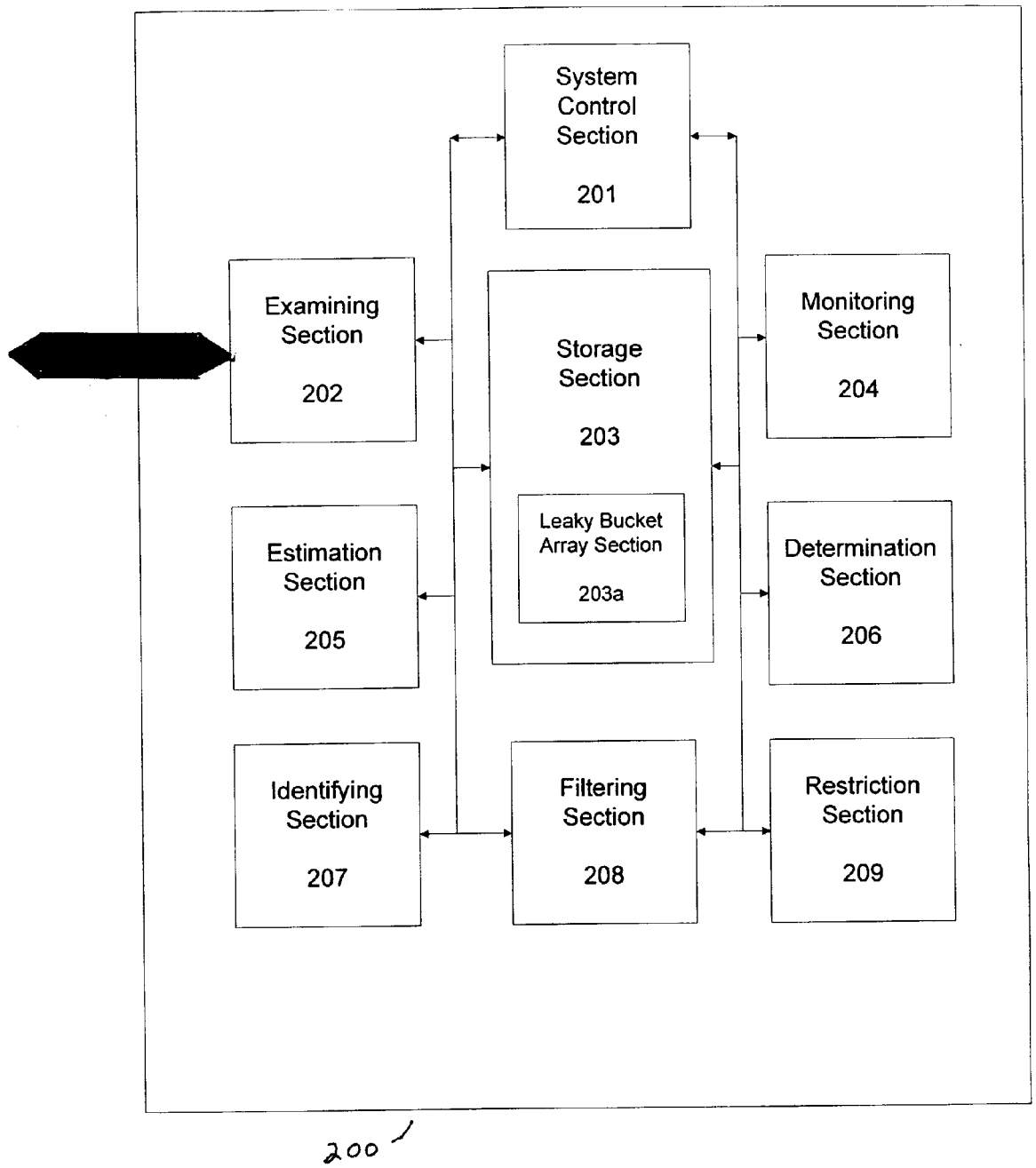
FIG. 4 shows a simplified block diagram of an NP according to one embodiment of the invention.

Turning now to FIG. 4, the sections of an exemplary embodiment of an NP 200 according to the present invention are described. NPs 200 monitor all communications between the routers 100 and the servers 300. For each IP Packet that reaches an NP 200, an examining section 202 is adapted to identify at least one criterion, such as the destination IP address, about the IP packet and a system control section 201 is adapted to generate a "hash" (or an indication of one additional unit) for each such IP packet depending on the IP packet's characteristic which is then stored according to this criterion in a storage section 203. The hash identifies each additional unit that enters the system. Thus, under such an embodiment, each time an IP packet with the same destination IP address passes an NP 200, the examining section 202 is adapted to detect and count its input string and the system control section 201 adapted to generate a hash for that particular destination IP address for eventual storage in storage section 203. Alternatively, the examining section 202 may be adapted to detect and count the prefix of the destination IP address. Additionally, the examining section 202 may be adapted to use any other criterion suitable for identifying IP packets as they arrive.

Each NP 200 "maps" hashes using Bloom Filter techniques. An exemplary Bloom Filter technique in accordance with the present invention is described as follows. The system control section 201 is adapted to construct a row of virtual "buckets" within a leaky-bucket array section 203*a* of the storage section 203 in order to store indicators associated with the number of hashes, per criterion, of IP packets received by the NP 200. As new IP packets enter the system and the examining section 202 detects and counts selected IP packet criterion (for example, the destination IP address of each IP packet), the system control section 201 is adapted to generate a hash for each IP packet which is stored in one of the virtual buckets in a uniform, random manner (alternatively known as generating a uniform, random output using a hash function). Consequently, each particular criterion will have a particular virtual bucket in a row associated with it.

In an exemplary embodiment of the present invention, each IP packet that is directed to "x" IP address always generates a hash for the same virtual bucket on that row. To implement this Bloom Filter technique, the system control section 201 is adapted to construct multiple levels of virtual buckets within the leaky bucket array section 203*a*. The system control section 201 is further adapted to distribute hashes in a uniform, random order to these additional rows (again through the use of a hash function) but each row will have hashes distributed in a different, uniform random order (i.e., through the use of different hash functions). Accordingly, when an IP packet arrives, the system control section 201 is adapted to generate a hash on each level and generally generates a hash for a different correspondingly ordered virtual bucket on each level.

The number of virtual buckets in each row need not, however, be the same as the amount of different unique criteria. This reduced number of virtual buckets is feasible because the different random functions used to distribute the hashes on different rows insures that different criterion will not generate hashes to the same correspondingly ordered virtual bucket on every row even though these different criteria may generate hashes to the same virtual bucket on one particular row. Therefore, though on any one row, one particular virtual bucket may fill faster than another and overflow due to the limited number of virtual buckets in the rows of the array, the occurrence of a faster filling virtual bucket that overflows will be generally limited to certain rows. In such circumstances, because the present invention (as described below) only indicates a DDOS attack when overflowing virtual buckets exist on every row, the invention will not falsely identify normal traffic flows as DDOS attacks.

In an exemplary embodiment of the present invention, Bloom Filter-like functions or techniques may be performed by a single section or a combination of various sections within an NP 200.

The system control section 201 is adapted to use "leaky-bucket" techniques to remove hashes from virtual buckets as they are filled. The system control section 201 is adapted to assign each virtual bucket a particular "drain rate" at which hashes are removed from the virtual bucket. Various criteria for determining drain rates are possible. Such criteria may be based on, but are not limited to, time, number of total hashes received, or any other variable criterion suitable for establishing a drain rate. In an exemplary embodiment of the present invention, the drain rate of a virtual bucket depends on the amount of time that a hash remains in the virtual bucket. The system control section 201 is adapted to remove a hash from a virtual bucket after a certain period of time has passed. Thus, the virtual bucket "leaks" and if the system control section 201 ceases assigning hashes to the virtual bucket, it eventually empties.

Each NP 200 comprises an estimation section 205 adapted to configure leaky-bucket parameters. In an exemplary embodiment of the present invention, the leaky-bucket parameters include, but are not limited to, a drain rate and bucket-size. Estimation section 205 is adapted to select the parameters based, at least in part, on past or normal traffic history or any other determined criteria. The estimation section 205 is adapted to determine the amount of indicators expected to be collected and stored in particular virtual buckets, or classifications, during a set period of time. In an exemplary embodiment of the present invention, periodic re-calibration of leaky-bucket parameters is done by the system control section 201 via online-learning of traffic rates or patterns under normal network conditions. The system control section 201 may also use simple sliding window algorithms to smooth out the randomness in the traffic rate.

A monitoring section 204 is adapted to monitor the virtual buckets within section 203a and determine if any of them exceed a given number of hashes. If the monitoring section 204 determines that a virtual bucket contains too many hashes, that virtual bucket is in an "overflowing" condition. Upon the onset of a DDOS attack, at least one virtual bucket on each level will enter an "overflowing" state. Arriving packets that consistently get mapped to an overflowing bucket at every level are highly likely to be ones which form the attacking traffic flows. These packets are said to be members of a suspicious flow. The destination IP address (or address prefixes) of such packets are the addresses (or address prefixes) of the servers or sub-networks being attacked.

The exemplary embodiment described above requires only "N" levels of "k" leaky virtual buckets to monitor and protect $N^k$ possible groups of servers or sub-networks. Because the system control section 201, along with the estimation section 205, is adapted to adjust the number of levels (N), the number of different virtual buckets on each level (k) and the leaky-bucket configuration parameters, the system control section 201 can control "false-positive" identification of a DDOS attack. Such control allows a legitimate flow to flow normally without being treated as an attacking flow. Such controls may be optimized by adjusting the probability of detection of a DDOS attack with the probability of a false alarm. These concepts are further addressed below.

The present invention may be further explained through an example which assumes that a Transmission Control Protocol (TCP) Synchronize/Start packet (SYN) flood attack is occurring. According to an exemplary embodiment of the present invention, when an IP packet arrives at an NP 200, the examining section 202 is adapted to analyze the fourth byte (the SYN bit) of each TCP header. The system control section 201 is then adapted to map an indicator of the arrival of each such byte to all levels and generate a "virtual" arrival into the corresponding virtual leaky buckets. If the normal arrival rate of TCP SYN bytes to a router is 50 per second (perhaps based on offline trace analysis), then the buckets may have their drain rates set to 500 per second (to accommodate normal fluctuations).

Consequently, in this example, the onset of a DDOS attack would lead to at least one virtual bucket overflowing at each level. Again, arriving packets that are consistently mapped to an overflowing virtual bucket at every level would be deemed to be ones that have a high probability of being part of an attacking traffic flow. The destination IP address of these packets would be the address of an attacked destination.

An exemplary embodiment of the present invention may be further enhanced if the system control section 201 is adapted to apply statistical sampling as well as conventional port and protocol-based filtering techniques to incoming traffic flows before they are stored. This allows for faster analysis and greater utilization of Bloom Filter techniques implemented by the present invention. For example, and without limitation, instead of passing every arriving IP packet to the storage section 203, the normal percentage or rate of TCP (SYN, Reset (RST), Acknowledge (ACK)) packets within normal traffic flows can be determined. For example, the monitoring section 204 may be adapted to determine that a traffic flow of three times the normal percentage or rate is abnormal. Additionally, the examining section 202 may comprise pre-processing filtering, or other techniques to extract only TCP (SYN, RST, ACK) packets. The system control section 201 is then adapted to only pass such packets on to the storage section 203.

In another exemplary embodiment of the present invention, the examining section 202 may be adapted to monitor traffic flows for particular input strings or the amount of traffic destined to a particular IP address. By routing such flows to the virtual leaky-bucket array section 203a (e.g., using the control section 201) and increasing the drain rate to compensate for the estimated normal increase in flows, the present invention may detect attacking flows based on percentages of particular input strings to particular IP destinations in addition to detecting excessive amounts of input strings.

In yet another exemplary embodiment of the present invention, the examining section 202 is adapted to monitor the rate of increase of particular flows to determine when such flows constitute an attacking flow. In such an embodiment, the system control section 201 may be adapted to increase the leaky-bucket drain rate of suspicious flows (e.g., every second) and set certain acceleration thresholds to determine when certain throttling or restrictive actions need to be taken.

If more than one NP 200 is deployed throughout a network, as shown in FIGS. 2 and 3, they may be adapted to collaborate in the detection and identification of IP packets. The results from one NP 200 may be shared and aggregated with those from other NPs 200. Such collaboration allows each NP 200 to notify each other when common, suspicious abnormalities are detected. This increases the efficiency and effectiveness of the system. Such a distributed approach may decrease the time it takes to detect and identify a DDOS attack.

One problem generally associated with the use of Bloom Filters and leaky-bucket techniques is that they become less effective as the number of attacking flows increases. One reason for this is that as more virtual leaky-buckets at each level begin overflowing, there is a greater chance that a normal flow will randomly be mapped into an already overflowing virtual bucket. This mapping of normal flows to overflowing virtual buckets results in false positive indications of attacking flows.

In an exemplary embodiment of the present invention, such false positives are resolved by the system control section 201. The system control section 201 may be adapted to increase the number of levels of virtual buckets within the leaky-bucket storage array section 203a or increase the number of virtual buckets within existing levels when the monitoring section 204 detects that a particular number of virtual buckets are overflowing in the existing array of virtual buckets for a sustained period of time. Alternatively, when the fraction of overflowing virtual buckets falls below another level for a sustained period of time, the system control section 201 may be adapted to decrease the number of levels of virtual buckets or the number of virtual buckets within existing levels. When the virtual bucket array or row size is enlarged or shrunk, the system control section 201 may be adapted to initialize certain virtual buckets at an empty, partially filled, filled, or overflowing level to maintain the proper monitoring of attacking flows in a manner consistent with the techniques used by a prior virtual bucket array size.

For example, and without limitation, one technique for implementing changes to a virtual array of leaky virtual buckets (filled using Bloom Filter techniques) upon being attacked by numerous flows is to set up NPs 200 that execute particular software routines. The storage section 203 may be adapted to initially configure the size of each level of the virtual leaky-bucket array at a given level "$i_k$." The monitoring section 204 may then be adapted to monitor the number of overflowing virtual buckets on each level. If the number of overflowing virtual buckets on a level is greater than a chosen number, for example a variable "Ni*xfactor" (with "Ni" being defined as the number of virtual buckets on a level and "xfactor" as a preset parameter), then an overcrowding indicator (e.g., overcrowding_count_i) may be increased by one. In an alternative embodiment the storage section 203 is adapted to store this overcrowding indicator and other variables apart from the leaky-bucket array section 203a.

Once the overcrowding indicator on a particular level exceeds a predetermined level (that may result in false positives) indicated, for example, by a variable "Omax," within a given period of time, the system control section 201 may be adapted to increase the size of that level within a leaky-bucket array (i.e., to level $i_{k+1}$). The system control section 201 may be adapted to change variables as is appropriate for the new level size in order to properly determine when the risk of false-positives or missed attacking flows has returned to a high level (i.e., the variables are changed dynamically after each change in the size of a level). If the overcrowding indicator does not exceed Omax within a predetermined period of time, the overcrowding indicator decreases at a given rate so overcrowding is only acted upon if it occurs consistently. In an exemplary embodiment of the present invention, the monitoring section 204 is adapted to continually monitor the leaky-bucket array section 203a at regular time intervals to insure proper monitoring of overflowing virtual buckets.

The monitoring section 204 can be further adapted to simultaneously monitor levels within the leaky-bucket array section 203a in order to determine when to decrease an array or row size. In doing so, the monitoring section 204 is adapted to use the same monitoring of leaky-bucket array levels for the number of overflowing virtual buckets. If the number of overflowing virtual buckets on a particular level is less than a predetermined number indicated, for example, by a variable "Ni/xfactor" (again with "Ni" being defined as the number of virtual buckets on a level and "xfactor" as a preset parameter), then an undercrowding indicator (e.g., undercrowding_count_i) is increased by one. As before, the monitoring section 204 is adapted to continually monitor the virtual leaky-bucket array section 203a at regular time intervals to insure proper monitoring of overflowing virtual buckets.

In an exemplary embodiment of the present invention, when the undercrowding indicator on a particular level exceeds a number that indicates a higher risk that attacking flows are going undetected, for example, indicated by a variable "Omin," within a given period of time, the system control section 201 is adapted to decrease the size of that level within the virtual leaky-bucket array (i.e., to level $i_{k-1}$). The system control section 201 is further adapted to adjust variables as appropriate for the new size of that level in order to determine when the risk of false-positives or missed attacking flows is too great. If the undercrowding indicator does not exceed Omin within a given period of time, the undercrowding indicator may decrease at a given rate so that undercrowding is only acted upon if it occurs consistently. The system control section 201 may be adapted to continue to further increase or decrease the size of the virtual leaky-bucket array within the leaky-bucket array section 203a as dictated by the monitoring section 204.

The system control section 201 is further adapted to adjust the relevant variables and indicators as needed to ensure that the levels within the virtual leaky-bucket array are not increased and decreased at the same time. For example, when the number of overflowing virtual buckets on a level increases and the variable for that level, Omax (used in determining when to expand a level in the virtual leaky-bucket array) increases, the other corresponding variable for that level, Omin (in determining when to shrink a level in the virtual leaky-bucket array) is correspondingly decreased or reset to zero.

When the monitoring section 204 determines that the system control section 201 needs to increase or decrease the size of a level of a virtual leaky-bucket array, the storage section 203 is adapted to go through a transition period during which virtual buckets on a level are initialized to an appropriate size and variables for resizing levels within the array are revised. Additionally, during any transition period of a level from one size to another, the monitoring section 204 may be adapted to become inactive on that level to avoid conflicts while virtual buckets are initialized.

As leaky-bucket array levels are expanded or shrunk, the storage section 203 is adapted to store each of the input strings in the new array level according to the size of the new array level. The storage section 203 is adapted to store the input strings at the new level after the system control section 201 is first adapted to establish a new-bucket-assignment index (i.e., a hash function or uniform random distribution) upon each change in the virtual leaky-bucket array level. The system control section 201 is adapted to use the new-bucket-assignment index (i.e., hash function or uniform random distribution) to assign hashes to virtual buckets that now hold either a greater or lesser amount of input strings. For example, and without limitation, if the input strings are stored in virtual buckets based on IP addresses, when an array size level is decreased a greater number of IP-addressed input strings will be assigned to similar virtual buckets. One skilled in the art will recognize that this technique for implementing changes to the array of leaky virtual buckets may be accomplished through a variety of alternative methods.

In another exemplary embodiment of the present invention, the examining section 202 is adapted to monitor the rate of distinct input strings received over a given period of time or the ratio of distinct input strings received for a given number of input strings in order to detect the beginning of a DDOS. Some additional background information may help in an understanding of this technique.

During a DDOS attack, the number of distinct source IP addresses within a fixed number of packet arrivals tends to change drastically due to random IP source address "spoofing" performed by the attacking flow. IP source address spoofing means IP packets in a DDOS attack are configured to appear to be addressed from acceptable sources and thus acceptable to a receiving source 300. Thus, when IP source address spoofing occurs, the number of packets generated per source IP address may deviate significantly from a normal value. In comparison, when a normal congestion situation at an IP address occurs due to normal customer activity, the number of different source IP addresses within a fixed number of total packet arrivals should remain stable as long as the behavior of a normal user remains unchanged. Conversely, within a fixed number of packets, the number of packets directed to dissimilar destination IP addresses during a DDOS attack is generally less than during a normal congestion situation as the attacking stream generally focuses on particular IP addresses. Thus, the ratio of the number of different source IP addresses over the number of different destination IP addresses significantly increases during a DDOS attack compared to the increases seen during normal traffic congestion.

Accordingly, in an exemplary embodiment of the present invention, the NP 200 may be adapted to continuously monitor the number of distinct source and destination IP addresses across a fixed number total packet arrival and over a fixed time interval. Over this fixed time interval or fixed number of total packet arrivals, the examining section 202 is adapted to examine, and the storage section 203 is adapted to store, the number of distinct source and destination IP addresses received. Alternatively, the examining section 202 may be adapted to monitor the number of identical source and destination IP addresses used together by IP packets. The estimation section 205 may be further adapted to compute estimated rates at which distinct input strings arrive during normal congestion times by starting with a storage array that is empty at the beginning of a given time interval and calculating an indication of distinct number of input strings at the end of the given time interval (possibly during a known period free of a DDOS attack). This may be repeated as many times as needed during normal congestion times, or during an observation cycle, to insure an accurate estimated rate (or expected ratio of distinct input strings for a given number of total input strings) for received input strings. The monitoring section 204 may also be adapted to utilize normal-congestion-time numbers to determine when such "normal" numbers sufficiently fluctuate as a way of monitoring DDOS attacks. This use of a Bloom Filter technique to establish estimated rates or expected ratios would not usually use a leaky-bucket technique.

For example, and without limitation, multiple NPs 200 may be set up to execute software techniques to observe certain statistics, or their ratios, over a fixed time interval to detect an attacking flow. In an exemplary embodiment of the present invention, the system control section 201 may be adapted to set up a storage array consisting of M bits of memory within storage section 203, perhaps defined as the M-bit memory. The system control section 201 may be further adapted to set a counter to record the number of distinct input strings (InStrings) received during a set period of time, perhaps defined as Dcount, within storage section 203. Each bit in the M-bit memory is initially set to zero. The system control section 201 may be further adapted to create a "hash" function (i.e., a uniform random generator), defined as H( ) (i.e., the "H" function), to generate output setting specific, k position bits in the M-bit memory equal to one when the system control section 201 enters an input string (i.e., H(InString)). (The greater the number of k position bits forced to one by a single input string, the lesser the chance of two distinct input strings not being recorded as distinct.) Then, for a set period of time, defined as Tobs, the system control section 201 is adapted to map each input string using the hash function and map the hash function output to k bits (i.e., k positions) within the M-bit memory, each time potentially setting one or more of these k bits to one. Before mapping the output of the hash function, H(InString), the system control section 201 is first adapted to examine the k bits of the M-bit memory for which the output is mapped to determine if all of those k bits about to be set have previously been set to one. If any one of these bits have not previously been mapped to one, then the system control section 201 is adapted to increase the distinct counter, Dcount, by one. The system control section 201 may be further adapted to set to one any mapped k bit that has not previously been set. Alternatively, or in conjunction therewith, the system control section 201 may be adapted to map in parallel a particular number of input strings, defined as Tis, rather than the amount received during a set period of time (i.e., Tobs).

The size of the M-bit memory, the number of potentially mapped k bits output from the hash function and the set period of time, Tobs (or the total number of input strings examined, Tis), determine the probabilities of how accurate the distinct counter, Dcount, is in recording the number of distinct input strings during the set period of time, Tobs (or during Tis). The system control section 201 may be adapted to change these variables based on desired probabilities or other factors.

Thereafter, the estimation section 205 is adapted to divide the amount of distinct input strings received during the set period of time, Dcount, by the set period of time, Tobs, to determine an estimated arrival rate of distinct input strings.

Similarly, the estimation section 205 may be adapted to compute an expected ratio of each distinct input string as a total of all input strings by dividing the number of distinct input strings, Dcount, by the total number of packets examined, Tis.

Generally, at least two different types of input strings are estimated for rates and ratios and subsequently monitored. One type of monitored input string is generally based on the source IP address portion of the IP packet and another type of input string is based on the destination IP address portion of the IP packet.

After the expected rates (or estimated ratios) are determined through the use of this exemplary Bloom Filter technique, the present invention envisions using them to monitor the network for DDOS attacks. During normal monitoring of a network, the system control section 201 is adapted to set up an M-bit memory consisting of k bits similar to that discussed above within the storage section 203. Likewise, the system control section 201 is adapted to set up a monitoring distinct counter, perhaps defined as MDcount, to record the total number of distinct input strings generated by the hash function within the storage section 203. In this example, the system control section 201 is further adapted to construct two sets of monitoring arrays, one for source IP addresses and one for destination IP addresses. The system control section 201 is adapted to use the hash function, perhaps designated H ( ), to map input strings to each of the M-bit memories as detailed above. Using the Bloom filter techniques described above, the system control section 201 may also be adapted to generate increases to the distinct counters, MDcount, as distinct input strings (InString) are received and mapped through the hash function, H(Instring), creating outputs to set k bits not previously set during a set period of time of monitoring, MTobs.

The monitoring section 204 may then be adapted to compare an actual arrival rate generated from the indicators received for a particular type of input string for a monitored period of time, MDcount/MTobs, to the estimated arrival rate of that same type of input string, Dcount/Tobs. If the monitoring section 204 determines that there is a sufficient difference or change between the actual arrival rate, MDcount/MTobs, and the estimated arrival rate, Dcounts/Tobs, (for example, the distinct count increases or decreases drastically) it will dictate that an "overflow" type situation exists.

Alternatively, the monitoring section 204 may be adapted to compare the indicators recorded, MDcount, for a particular type of input string for an amount of total input strings received, Tis, to the expected input string ratio, Dcount/Tis. Again, if the monitoring section 204 determines that there is a sufficient difference between the actual input string ratio, MDcount/Tis, and the expected input string ratio, Dcount/Tis, it will dictate that an "overflow" situation exists. The NP 200 reacts to "overflow" situations in a manner similar to other overflow situations otherwise described herein.

It should be understood that in any of the operations described herein, a particular function of any given section may alternatively be performed by, or with, one or more other sections. In addition, though shown as separate sections, sections 201-209 may be combined to carry out the features and functions of the present invention.

Regardless of the technique used to determine the onset of a DDOS attack, once an NP 200 determines that a DDOS attack may be occurring, a restriction section 209 will, generally, be adapted to restrict the resource-consumption of all traffic flows destined to the servers of sub-networks suspected of being under attack. More specifically, the restriction section 209 may be adapted to activate alternative scheduling, buffer management or a routing scheme.

After the resource-consumption of the traffic flows is restricted, a determination section 206 is adapted to perform a fine-grain analysis on the suspicious IP packets to determine filtering rules. These rules are used to distinguish between legitimate and attacking traffic. While this analysis can be conducted offline using various well-known data-mining techniques, there are great incentives to perform such analysis online in order to reduce reaction time and eliminate packet storage requirements.

One type of online analysis is online "profiling" of suspicious traffic flows where such results are compared to some known "invariant" of a normal traffic profile. In an exemplary embodiment of the invention, NPs 200 are adapted to collaborate in a distributed manner to share, aggregate and compare their individual findings related to profiles of normal and suspicious traffic. The determination section 206 is adapted to determine filter rules for identifying traffic characteristics that indicate the presence of excessive IP packets.

Examples of invariant traffic characteristics or features that may be considered include, but are not limited to: the percentage share of TCP, User Data Protocol (UDP) and Internet Control Message Protocol (ICMP) packets within the flow or subnet; the portion of TCP packets with SYN, RST or ACK flags set; the share of fragmented IP packets and offset values they carry; the distribution of packet sizes; the distribution of destination port numbers; the distribution of Time-To-Live (TTL) values; and the distribution of IP/TCP header lengths to detect the abuse of optional IP/TCP headers. A deviation from an invariant traffic statistic may be treated as a factor indicating an abnormal condition.

In another exemplary embodiment of the present invention, an identifying section 207 is adapted to use the determined filter rules throughout the network to identify input strings which possess a certain number or level of features that sufficiently deviate from a normal profile. For example, and without limitation, the existence of an abnormally high portion of UDP traffic, certain packet sizes and certain destination port numbers may be designated to indicate an excessive flow. The identifying section 207 may be adapted to identify IP packets associated with such identified input strings. Such identified IP packets are considered part of an attacking flow.

After determining that IP packets containing particular factors are attacking flows, a filtering section 208 is adapted to filter IP packets using these factors. In addition to other types of filtering, the filtering section 208 may be adapted to filter IP packets by blocking or re-routing attacking IP packets.

The effectiveness of a set of filtering rules depends on the number of features within a normal traffic profile and the invariant nature of the features. Again, the computational requirements for the construction of normal and suspicious traffic profiles can be reduced by using statistical sampling techniques.

After filtering rules are determined, routers 100 may be adapted to operate using such rules. For example, routers 100 may be adapted to trace the source of the attacks or re-route attacking traffic to some archival site for further forensic evidence collection or detailed offline analysis. Routers 100 may be adapted to carry out probabilistic marking of IP packets or intentional ICMP trace-backs to trace the source of an attack.

While the present invention has been described in detail with particular reference to exemplary embodiments thereof, it will be understood that variations and modifications can be effected within the scope of the invention as defined by the appended claims.

We claim:

1. A device for detecting and filtering excessive Internet Protocol (IP) packets comprising:
   an examining section adapted to count strings of IP packets traveling from at least one IP source outside a security perimeter to at least one network device within the security perimeter;
   a system control section adapted to record indicators of the amount of counted strings, by different classifications, using an IP-address based hash function, wherein at least one of the classifications is based on a destination IP address and further vary a number of storage areas, each area used to store one or more of the indicators, to avoid a false indication of a malicious attack of IP packets; and
   a monitoring section adapted to determine when an amount of stored indicators in a particular classification is greater than an amount of estimated indicators during a set period of time for a particular classification, thereby creating an overflow of stored indicators in said classification, wherein one of the indicators is an overcrowding indicator, the monitoring section further adapted to compare the value of the overcrowding indicator to a predetermined level in order to avoid a false indication of a malicious attack of IP packets.

2. The device of claim 1, wherein the device is part of a system that comprises a plurality of devices, said devices situated in logically concentric rings so as to define security zones; and
   said devices adapted to exchange information regarding said security zones.

3. The device of claim 1, wherein the device is a network processor.

4. The device of claim 1, further comprising:
   an estimation section adapted to estimate the amount of indicators expected to be recorded in particular classifications during the set period of time.

5. The device of claim 4, further comprising
   a determination section adapted to determine rules to identify the strings that generated the stored indicators in said overflow classification;
   an identifying section adapted to identify overflow strings and excessive IP packets associated with such overflow strings using said rules; and
   a filtering section adapted to filter said excessive IP packets.

6. The device of claim 5, further comprising an identifying section adapted to identify specific destination IP addresses for which excessive IP packets are destined.

7. The device of claim 5, further comprising a restriction section adapted to restrict resources utilized by excessive IP packets.

8. A method for detecting and filtering excessive Internet Protocol (IP) packets said method comprising the steps of:
   examining strings of IP packets traveling from at least one IP source outside a security perimeter to at least one network device within the security perimeter;
   recording indicators of the amount of strings, by different classifications, using an IP-address based hash function, wherein at least one of the classifications is based on a destination IP address;
   varying a number of storage areas, each area used to store one or more of the indicators, to avoid a false indication of a malicious attack of IP packets; and
   monitoring an amount of stored indicators to determine when the amount of stored indicators in a particular classification is greater than an amount of estimated indicators during a set period of time for a particular classification, thereby creating an overflow of stored indicators in said classification, wherein one of the indicators is an overcrowding indicator, the monitoring step further comprising the step of comparing the value of the overcrowding indicator to a predetermined level in order to avoid a false indication of a malicious attack of IP packets.

9. The method of claim 8, wherein the amount of indicators expected to be collected and recorded is based on past traffic history.

10. The method of claim 8, further comprising the step of applying statistical sampling to IP packets before they are examined.

11. The method of claim 8, further comprising the steps of:
providing two or more devices in logically concentric rings so as to define security zones; and
exchanging information regarding said security zones between said devices.

12. The method of claim 8, further comprising the steps of:
estimating the amount of indicators expected to be recorded in particular classifications during the set period of time.

13. The method of claim 12, wherein the set period of time is based on past traffic history.

14. The method of claim 12, wherein the amount of indicators expected to be recorded is modified based on traffic parameters.

15. The method of claim 12, further comprising the step of smoothing out randomness in traffic parameters using a sliding window.

16. The method of claim 12, further comprising the steps of monitoring the total number of overflowing classifications; and
altering the classification recordation manner based on the number of overflowing classifications.

17. The method of claim 12, further comprising the steps of estimating a ratio of an expected number of indicators for strings associated with different source IP addresses compared to an expected number of indicators for strings associated with different destination IP addresses;
determining when the ratio of an actual number of indicators for strings associated with different source IP addresses compared to the actual number of indicators for strings associated with different destination IP addresses is sufficiently different than the estimated ratio; and
indicating an overflow classification when said actual ratio sufficiently differs from said estimated ratio.

18. The method of claim 12, further comprising the steps of monitoring the rate at which the IP packets arrive;
estimating an expected rate of IP packet arrivals; and
determining when said rate of IP packet arrivals in a particular classification is greater than the estimated rate of IP packet arrivals during a set period of time thereby creating an overflow of stored indicators in said classification.

19. The method of claim 12, further comprising the steps of:
determining rules to identify the strings that generated the recorded indicators in said overflow classification;
identifying overflow strings and excessive IP packets associated with such overflow strings using said rules; and
filtering said excessive IP packets.

20. The method of claim 19, further comprising the step of identifying specific destination IP addresses for which excessive IP packets are destined.

21. The method of claim 19, further comprising the step of restricting resources utilized by excessive IP packets.

22. The method of claim 21, further comprising the step of activating alternative scheduling of IP packets at routers.

23. The method of claim 21, further comprising the steps of activating alternative buffer management and routing schemes of the IP packets.

24. The method of claim 19, wherein said rules are determined based on monitoring of User Data Protocol (UDP) traffic, packet size and the number of times a particular destination port number is used.

25. The method of claim 19, wherein said rules are determined based on monitoring percentage shares of Transmission Control Protocol(TCP), User Data Protocol (UDP) and Internet Control Message Protocol (ICMP) packets.

26. The method of claim 19, wherein said rules are determined based on monitoring packet size distributions.

27. The method of claim 19, wherein said rules are determined based on destination port numbers.

28. The method of claim 21, wherein said rules are determined based on the distribution of Time-To-Live values.

* * * * *